July 22, 1952  A. H. GUNDERSEN ET AL  2,603,937

BROOM RAKE

Filed Jan. 25, 1951  2 SHEETS—SHEET 1

INVENTORS.
ANDREW H. GUNDERSEN
LEROY A. GUNDERSEN
BY
Harry H. Hilgeman
ATTORNEY.

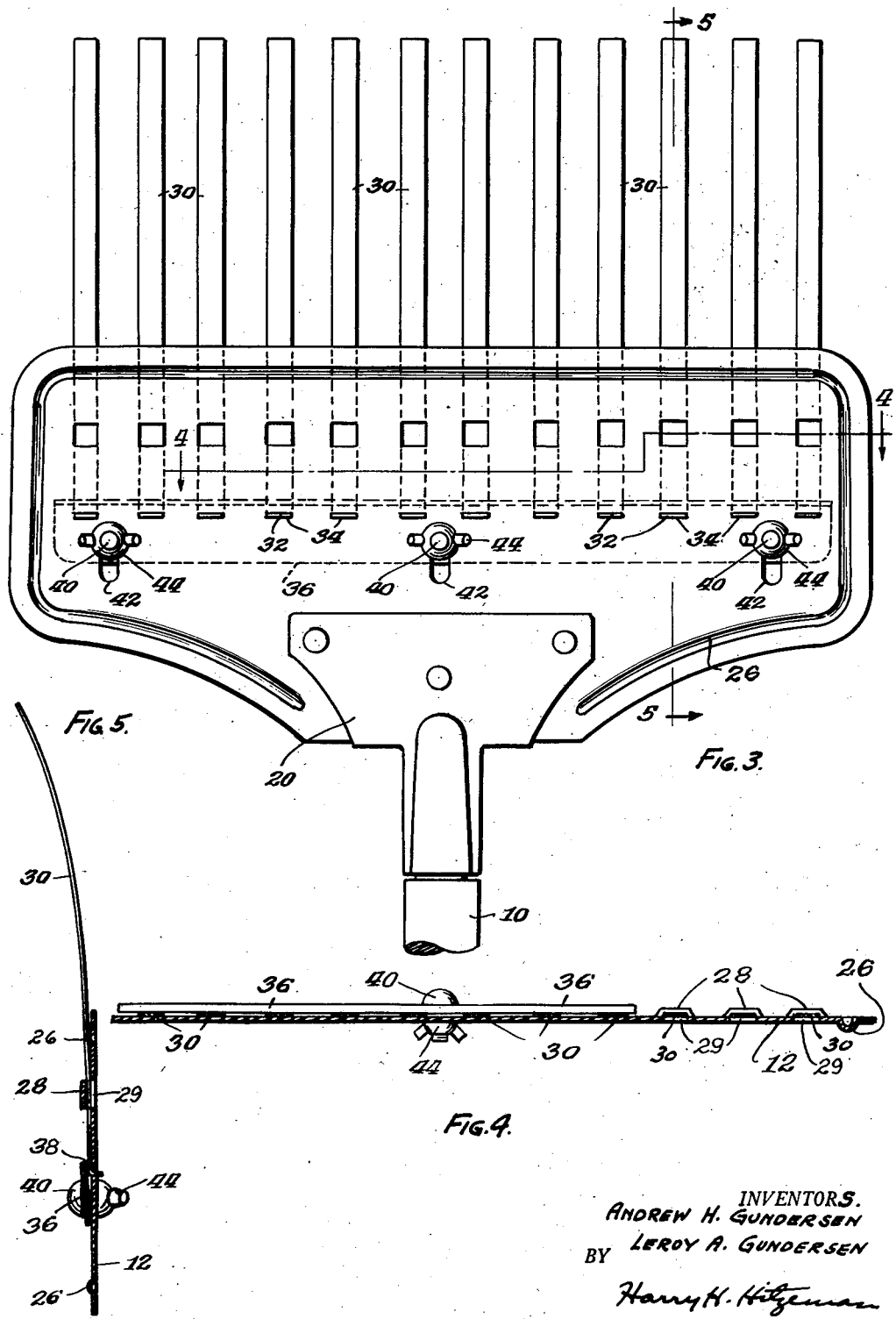

UNITED STATES PATENT OFFICE 2,603,937

BROOM RAKE

Andrew H. Gundersen, Plano, and Le Roy A. Gundersen, Elgin, Ill.

Application January 25, 1951, Serial No. 207,693

3 Claims. (Cl. 56—400.17)

Our invention relates to improvements in the construction of rakes or similar devices.

Our invention relates more particularly to an improved construction of rake of the type known as garden rakes, for use in raking leaves or doing other similar work.

Rakes of this type usually have long curved teeth or tines which extend from the frame or holder to which the handle is attached. The teeth or tines are of course equally spaced across the width of the rake and are resilient or flexible so they bend or flex when used in raking. Most teeth or tines are either constructed of wire or flat spring metal or wood. One or more of the same may become bent or broken in use and with the ordinary rake it is not possible to replace the individual tines.

The principal object of the present invention is to provide an improved construction of rake so arranged that each tooth of the rake is individually replaceable.

A further object of the invention is to provide a rake construction wherein each individual tooth is locked in place at its end and also held against lateral displacement by a bridged construction of the holder.

A further object of the invention is to provide an improved construction of rake with replaceable individual teeth for the same, wherein improved means is provided for quick locking of all the teeth in operative position, yet which is easily released so that any one or more individual teeth may be removed and replaced.

For a more comprehensive understanding of the features of novelty involved and the significance of the various details of construction, reference is had to the accompanying drawings upon which Fig. 1 is a front perspective view of a rake constructed in accordance with our invention;

Fig. 3 is a back elevational view showing the locking slots and other details of the back of the holder;

Fig. 4 is a cross-sectional view taken generally on the line 4—4 of Fig. 3; and

Fig. 5 is a vertical sectional view taken on the line 5—5 of Fig. 3.

Figure 1:
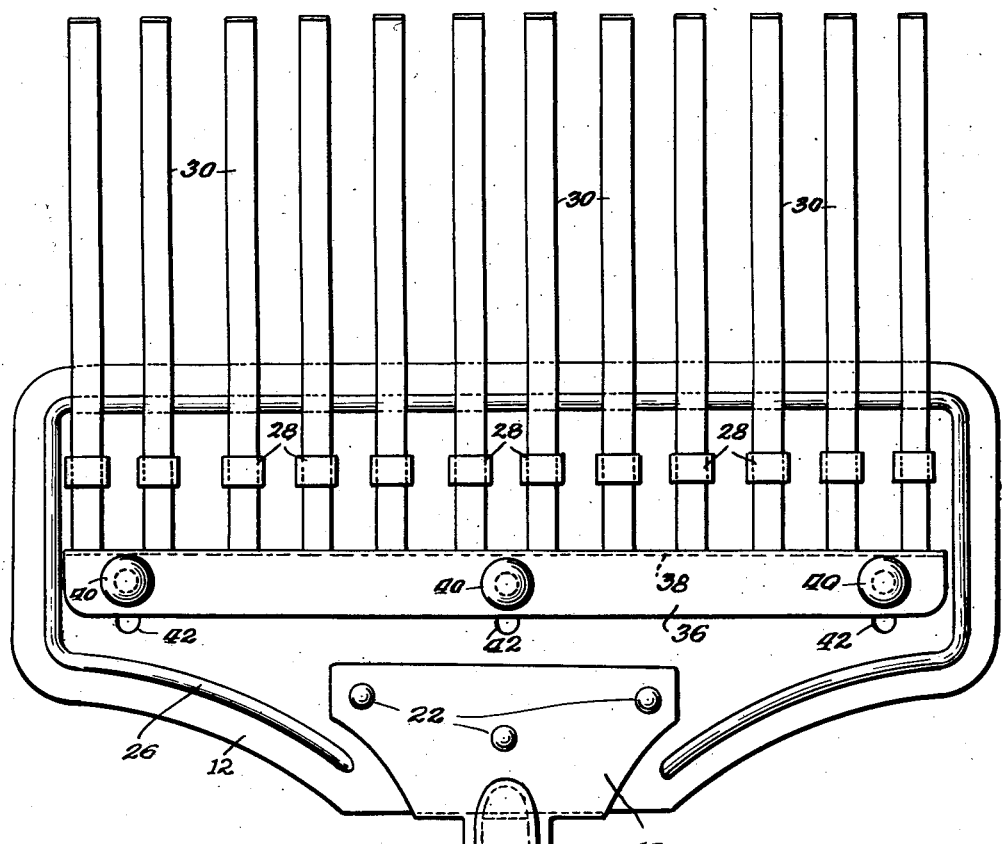

In the embodiment of the invention which we have illustrated in the drawings, we show a rake of the type usually used for raking leaves, which includes a handle 10, a frame 12 and a plurality of equally spaced flexible teeth or tines 30 extending downwardly therefrom.

Figure 2:
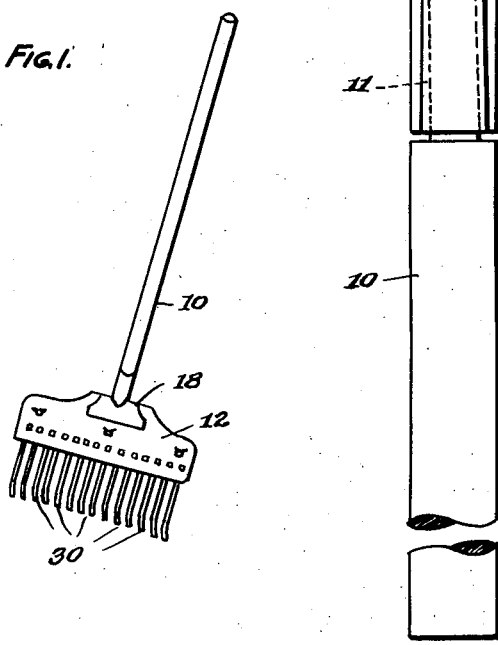
Fig. 2 is a front elevational view of the rake with the handle broken off.

The frame 12 as best shown in Figs. 2 and 3 may be connected to the handle 10 by means of a pair of plate members 18 and 20, connected together by the rivets 22 through the back portion of the sheet metal frame member 12. Each of the plate members 18 and 20 is formed with an elongated hemispherical groove to frictionally receive the reduced end 11 of the wooden handle 10, the end 11 of the handle being slotted to receive the edge of the frame 12 to prevent the handle 10 from turning.

The holder or frame 12 may be formed of sheet metal preferably about 20 gauge and has the ledge or reinforcing rib 26 formed therein about the major portion of its periphery.

The body of the frame is also slotted and bent to provide a plurality of equally spaced bridge members 28 describing rectangularly shaped openings 29 therebeneath, the openings being adapted to receive the tines or teeth 30 which form the rake. The tines or teeth are formed at their back end with L-shaped ledges 32 received in elongated slots 34 stamped in the frame 12. The row of slots 34 are arranged normal to the handle and adjacent the handle end of the frame.

Means for holding the tines or teeth rigidly in the position shown may include an L-shaped bracket 36 having a downwardly depending ledge 38 adapted to frictionally bear against the back ledges of the teeth adjacent the slots 32. The bracket 36 may be held in position by means of a plurality of bolt members 40 extending through elongated slots 42 in the frame 12 and provided at their back end with wing nut members 44.

From the above and foregoing description it can thus be seen that when it is desired to assemble a rake of the type described herein a plurality of tines are passed through the bridge portions 28 of the frame 12 outwardly until the ledge 32 snaps into position in the slots 34. After all the teeth have thus been assembled upon the frame 12 the L-shaped bracket is fastened in position by means of the bolts 40 and wing nuts 44 to lock the ledges 32 at the ends of the teeth into the slots 34.

From the above and foregoing description it can be seen that by the locking and spacing arrangement provided complete support is given to each individual tooth. It is held rigidly against any possible movement and due to its bracing under the bridge 28 and over the ridge 26 it can be seen that it is effectively held in an operative position.

When one or more of the teeth become broken or too badly bent to be of further use it is a simple matter to remove the bracket 36 and take out the damaged teeth replacing them with new ones.

While I have illustrated and described a specific embodiment of the invention, it will be apparent to those skilled in the art that changes and modifications may be made in the exact details shown and I do not wish to be limited in any particular; rather what I desire to secure and protect by Letters Patent of the United States is:

1. A rake of the type described having a handle, a plate-like frame connected to the end of said handle, said frame having a row of slots arranged normal to said handle and adjacent said end thereof, said frame also having a row of spaced bridge members in substantial parallel alignment therewith and with said handle and outwardly of said slots, a plurality of tooth members, each tooth member having an L-shaped ledge at its end adapted to lodge in one of said slots, and said tooth members extending forward below said bridge members and means operatively associated with said tooth members to securely hold them in said slots and under said bridge members.

2. A rake of the type described having a handle, a plate-like frame connected to the end of said handle, said frame having a row of slots arranged normal to said handle and adjacent said end thereof, said frame also having a row of spaced bridge members in substantial parallel alignment therewith and with said handle and outwardly of said slots, a plurality of tooth members, each tooth member having an L-shaped ledge at its end adapted to lodge in one of said slots, said tooth members extending forward below said bridge members and means operatively associated with said tooth members to securely hold them in said slots and under said bridge members, said means comprising a removable hold-down bracket attached to said frame.

3. A rake of the type described having a handle, a plate-like frame connected to the end of said handle, a reinforcing ledge extending around the major portion of the periphery of said frame, said frame having a row of slots arranged normal to said handle and adjacent said end thereof, said frame also having a row of spaced bridge members in substantial parallel alignment therewith and with said handle and outwardly of said slots, a plurality of tooth members, each tooth member having a L-shaped ledge at its end adapted to lodge in one of said slots, said tooth members extending forward below said bridge members and over said peripheral reinforcing ledge, and means operatively associated with said tooth members to securely hold them in said slots and under said bridge members, said means comprising a removable hold-down bracket attached to said frame.

ANDREW H. GUNDERSEN.
LE ROY A. GUNDERSEN.

REFERENCES CITED

The following references are of record in the file of this patent:

UNITED STATES PATENTS

| Number | Name | Date |
|---|---|---|
| 1,693,492 | Ostberg | Nov. 27, 1928 |
| 1,760,660 | Peterson | May 27, 1930 |
| 2,116,292 | Tsuchiya | May 3, 1938 |
| 2,252,114 | Brown | Aug. 12, 1941 |